(12) United States Patent
Jenks et al.

(10) Patent No.: US 10,534,746 B2
(45) Date of Patent: Jan. 14, 2020

(54) SYSTEM AND METHOD FOR DEFINING MACHINE-TO-MACHINE COMMUNICATING DEVICES AND DEFINING AND DISTRIBUTING COMPUTATIONAL TASKS AMONG SAME

(71) Applicant: Droplit, Inc., Melbourne, FL (US)

(72) Inventors: Bryan Jenks, West Melbourne, FL (US); Nikolas Doukellis, West Melbourne, FL (US); Christopher Woodle, St. Petersburg, FL (US)

(73) Assignee: Droplit, Inc., Melbourne, FL (US)

(*) Notice: Subject to any disclaimer, the term of this patent is extended or adjusted under 35 U.S.C. 154(b) by 100 days.

(21) Appl. No.: 15/590,777

(22) Filed: May 9, 2017

(65) Prior Publication Data

US 2017/0322904 A1 Nov. 9, 2017

Related U.S. Application Data

(60) Provisional application No. 62/333,576, filed on May 9, 2016.

(51) Int. Cl.
*G06F 15/173* (2006.01)
*H04L 29/08* (2006.01)
(Continued)

(52) U.S. Cl.
CPC ...... *G06F 15/17343* (2013.01); *G06F 3/0638* (2013.01); *H04L 67/125* (2013.01);
(Continued)

(58) Field of Classification Search
CPC .... G06F 3/0638; G06F 3/08; G06F 15/17343;
G06F 8/654; G06F 9/45512; H04L
41/5045; H04L 41/5048; H04L 12/66;
H04L 67/141; H04L 67/148; H04L 67/34;
H04L 69/321; H04L 41/0213; H04W
4/70;
(Continued)

(56) References Cited

U.S. PATENT DOCUMENTS 10,148,497 B1 * 12/2018 Roche ................ H04L 41/0853
10,250,680 B2 * 4/2019 Watts ................ H04L 67/1095
(Continued)

FOREIGN PATENT DOCUMENTS

WO 2016176111 A1 11/2016

*Primary Examiner* — Todd L Barker
(74) *Attorney, Agent, or Firm* — Daniel C. Pierron; Widerman Malek, PL

(57) ABSTRACT

A system and method for issuing commands to remote devices comprising determining a criterion that forms a rule for a service, the service comprising a service property, a service method, and a service event, distributing the rule to a behavior engine on a programmable device, the behavior engine comprising a set of rules, and evaluating, at the behavior engine, if a trigger criterion for the rule is met. Upon determining that the trigger criterion is met, the method may further comprise performing an action comprising evaluating, at the behavior engine, if a condition is met, and upon determining that the condition is met, issuing a command to perform a first action comprising setting a service property and calling a service method for all devices including the service property within a scope of the action, defining an action scope.

17 Claims, 7 Drawing Sheets

(51) Int. Cl.
  *G06F 3/06* (2006.01)
  *H04W 4/70* (2018.01)
  *G06F 3/08* (2006.01)
  *H04L 12/66* (2006.01)
(52) U.S. Cl.
  CPC .............. *H04W 4/70* (2018.02); *G06F 3/08* (2013.01); *H04L 12/66* (2013.01)
(58) Field of Classification Search
  CPC ..... H04W 16/28; H04W 40/02; H04W 84/01; H02J 50/80
  See application file for complete search history.

(56) References Cited

U.S. PATENT DOCUMENTS

| | | | |
|---|---|---|---|
| 10,331,155 B1* | 6/2019 | Roche | G05F 1/66 |
| 2003/0142660 A1* | 7/2003 | Nishimura | H04L 45/122 370/351 |
| 2014/0244834 A1* | 8/2014 | Guedalia | H04L 67/16 709/224 |
| 2015/0264138 A1* | 9/2015 | Watts, Jr. | H04L 67/1095 709/203 |
| 2016/0094398 A1* | 3/2016 | Choudhury | H04L 45/42 370/254 |
| 2016/0112240 A1* | 4/2016 | Sundaresan | H04W 4/90 726/1 |
| 2016/0150537 A1* | 5/2016 | Jung | H04W 48/16 455/452.1 |
| 2017/0013062 A1* | 1/2017 | Kim | H04L 67/125 |
| 2017/0126504 A1* | 5/2017 | Fang | H04L 41/12 |
| 2017/0180289 A1* | 6/2017 | Chiappone | H04L 67/22 |
| 2017/0289271 A1* | 10/2017 | Seed | H04L 67/34 |
| 2017/0353869 A1* | 12/2017 | Sen | H04W 16/28 |
| 2018/0206094 A1* | 7/2018 | Choi | H04L 12/28 |
| 2018/0375720 A1* | 12/2018 | Yang | H04L 29/08 |
| 2019/0101616 A1* | 4/2019 | Nedelcu | G01S 5/0284 |
| 2019/0182098 A1* | 6/2019 | Ly | G06F 9/45512 |

\* cited by examiner

110

111
```
{
  "name":"BinarySwitch",
  "properties":{  — 120
    "switch":{
121     "values":["on","off"]
    }
  },
  "methods":{  — 130
    "switchOn":{
131     "description":"Sets switch to on"
    },
    "switchOff":{
132     "description":"Sets switch to off"
    }
  }
}
```

FIG. 1

```
112
{
    "name":"MediaInfo",
    "properties":{
122     "albumArt":{
            "valueType":"uri",
            "access":"read"
        },
123     "albumTitle":{
            "valueType":"string",
            "access":"read"
        },
124     "artist":{
            "valueType":"string",
            "access":"read"
        },
125     "nextAlbumTitle":{
            "valueType":"string",
            "access":"read"
        },
126     "nextArtist":{
            "valueType":"string",
            "access":"read"
        },
127     "nextTrackName":{
            "valueType":"string",
            "access":"read"
        },
128     "trackName":{
            "valueType":"string",
            "access":"read"
        }
    },  140
    "methods":{},
    "events":{
141     "trackChanged":{
            "description":"Indicates the currently playing track has changed"
        }
    }
}
```

SYSTEM AND METHOD FOR DEFINING MACHINE-TO-MACHINE COMMUNICATING DEVICES AND DEFINING AND DISTRIBUTING COMPUTATIONAL TASKS AMONG SAME

RELATED APPLICATIONS

This application claims the benefit under 35 U.S.C. § 119(e) of U.S. Provisional Patent Application Ser. No. 62/333,576 filed on May 9, 2016 and titled System and Method for Defining Machine-to-Machine Communicating Devices and Defining and Distributing Computational Tasks Among Same, the entire content of which is incorporated herein by reference

FIELD OF THE INVENTION

The present invention relates to systems and methods for providing a common method for defining and operating disparate machine-to-machine communicating devices.

BACKGROUND

The provisioning and control of machine-to-machine communicating remote devices, often referred to as the Internet of Things (IoT), is an increasing challenge. The genesis of this challenge is multifaceted. First is the variety of communication protocols utilized by such devices, such as, but not limited to, Bluetooth, Zigbee, Z-Wave, 802.11, USB, Ethernet, and many others. Each of these protocols have their own strengths and weaknesses, all of which must be considered both when designing the remote device and when designing software to interact with the remote device.

Another source is the inherent differences that arise when attempting to communicate among remote devices from different product designers. Each remote device may have a unique interface that may enable third-party developers to interact with the remote device. While remote devices (for example, light bulbs) from different product designers may have similar functionality (e.g. brightness, color, color temperature), the amount and difficulty of programming involved to interact with remote devices from each product developer can be substantial.

Because of the diversity of machine-to-machine communicating remote devices product developers currently available on the market, across multiple technology industries, the permutations involved in enabling intercommunication and control of all, or even a critical mass, of these products results in enormous challenges for newcomers to the market to facilitate interoperability between their new product and the universe of previously-existing products. Moreover, there are similar barriers for consumers to provision, control, and tailor usage of these devices. Accordingly, there is a need in the art for systems and methods that simplifies the provisioning and control of IoT devices across multifarious platforms and communication protocols.

Additionally, as a result of the ever-increasing number of IoT devices, the amount of network traffic has similarly increased. Centralized architectures that require all status checks and commands to be issued from a single cloud server to IoT devices serves to increase the overall amount of network traffic. A decentralized architecture, particularly one that is operable to automatically analyze and distribute monitoring and command issuing processing to the lowest-level computerized device within the network of IoT devices, would serve to reduce the amount of network traffic.

Accordingly, there is a need in the art for systems and methods that accomplish this.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method for issuing commands to remote devices comprising determining a criterion that forms a rule for a service, the service comprising a service property, a service method, and a service event, distributing the rule to a behavior engine on a programmable device, the behavior engine comprising a set of rules, and evaluating, at the behavior engine, if a trigger criterion for the rule is met. Upon determining that the trigger criterion is met, the method may further comprise performing an action comprising evaluating, at the behavior engine, if a condition is met, and upon determining that the condition is met, issuing a command to perform a first action comprising setting a service property and calling a service method for all devices including the service property within a scope of the action, defining an action scope.

In some embodiments, the trigger criterion is at least one of a service property having a particular state, a service method being called, and a service event providing an indication. The trigger criterion may be evaluated continuously by the behavior engine. The rule may comprises a plurality of trigger criteria and may be distributed to a computerized device with the shortest network distance between the computerised device and events related to the trigger criteria.

In some embodiments, the rule may be distributed to at least one of a cloud server, a local hub, and a remote device. Additionally, the rule may be distributed to the cloud server and the method may further comprise communicating with at least one of a connectivity provider and a third-party device cloud server. Furthermore, the method may comprise translating the command to a transmission that can be understood by at least one of the third-party device cloud server and the remote device.

In some embodiments, upon determining the condition is not met, the method may further comprise performing at least one of terminating the action and repeating the evaluation of if the condition is met for at least one of some length of time, some number of evaluations, or until the condition is met. The method may comprise receiving a confirmation that the first action was completed.

In some embodiments, the method may further comprise identifying a behavioral pattern related to a device and defining a rule based on the identified behavioral pattern.

In some embodiments, the method may further comprise performing the action for a length of time, defined as an action length. Identifying a new device within the action scope comprising the service property being set by the first action during the action length, and performing the first action on the new device.

In some embodiments, the method may further comprise receiving a device definition comprising a service, the device definition defining a new device. The method may further comprise assigning the new device to one of a plurality of local hubs. The device definition may further comprise metadata about the new device.

In some embodiments, the method may further comprise receiving a device definition the device definition defining a new device and translating the device definition to define a service associated with the new device.

Embodiments of the invention are also directed to a service definition for a machine-to-machine communicating device, the service definition being a data structure comprising a service property describing a state of an attribute of the remote device, a service method operable to cause a change in the state of the service property, and a service event defining the result of performing the service method. The service properly may be directed to an attribute shared between differing types of machine-to-machine communicating devices, and the service method may be operable to change the state of the service property on differing types of machine-to-machine communicating devices.

In some embodiments, the service property may be operable to be monitored concurrent with the same service property on a differing machine-to-machine communicating device. The service method may be operable to be executed concurrent with the same service method on a differing machine-to-machine communicating device by a single command. The service event may be operable to be received concurrent with the same service event from a differing machine-to-machine communicating device.

In some embodiments, the service definition may be configured to be included in a definition of the machine-to-machine communicating device that comprises multiple differing service definitions. The service definition may be configured to be included in a definition of multiple instances of the same type of machine-to-machine communicating devices.

Embodiments of the invention are also directed to a programmable device comprising a service definition for a machine-to-machine communicating device, the service definition being a data structure comprising a service property describing a state of an attribute of the remote device and being operable to be monitored concurrent with the same service property on a differing machine-to-machine communicating device, a service method operable to cause a change in the state of the service property and be executed concurrent with the same service method on a differing machine-to-machine communicating device by a single command, and a service event defining the result of performing the service method and being operable to be received concurrent with the same service event from a differing machine-to-machine communicating device. The service property may be directed to an attribute shared between differing types of machine-to-machine communicating devices and the service method may be operable to change the state of the service property on differing types of machine-to-machine communicating devices.

BRIEF DESCRIPTION OF THE DRAWINGS

FIG. 1 is a representation of a service member of a machine-to-machine communicating device definition according to an embodiment of the invention.

FIG. 2 is a representation of another service member of a machine-to-machine communicating device definition according to an embodiment of the invention.

FIG. 6 is a representation of a rule comprised by a behavior engine according to an embodiment of the invention.

DETAILED DESCRIPTION OF THE INVENTION

Figure 3:
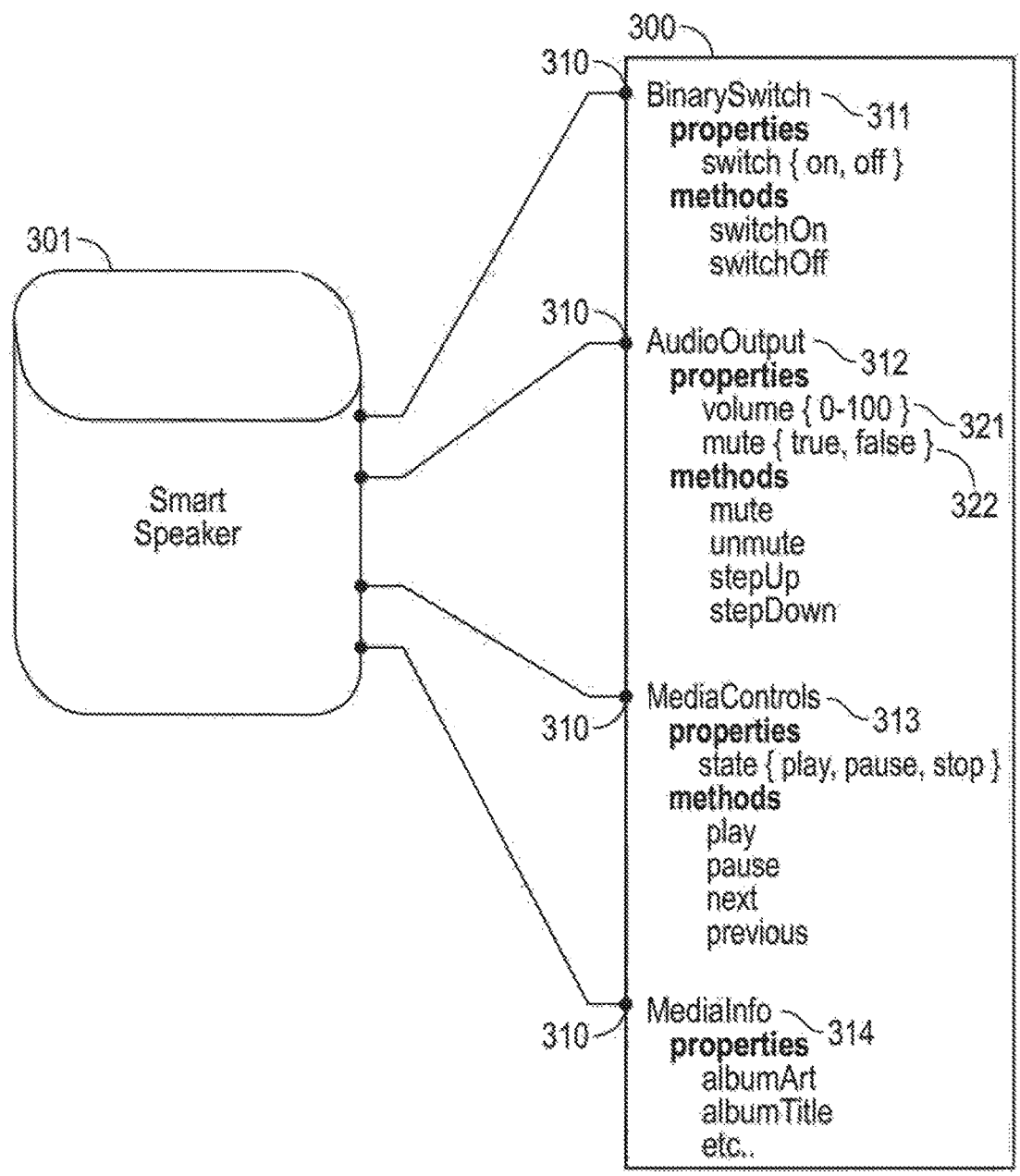
FIG. 3 is a representation of a machine-to-machine communicating device definition according to an embodiment of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring now to FIGS. 1-2, a machine-to-machine communicating device definition according to an embodiment of the invention will be discussed in detail. A definition, as understood within the context of this invention, may comprise a plurality of services 110. The services 110 are a related set of functionality that is provided by the device described by the definition 110. Put another way, the services 110 are class definition for the device associated with the definition. For each way that the device associated with the definition may receive information, may provide information, may operate, and may be operated so as to be in a particular state, there may be an associated service 110. Each service 110 may comprise at least one of a service property 120, a service method 130, and a service event 140.

A service property 120 may be understood as describing a single attribute state of the device associated with the definition. More specifically, the service property 120 describes a state of the device that is manipulate upon receiving a command that may either maintain the state or change the state of the device associated with the definition. Each service 110 may have any number of service properties 120. Among differing devices, a service property 120 that is common among them may be described in an identical manner, such that a single command can be disseminated among multiple disparate devices, that may be identical in functionality or may have substantially different functionality, to either maintain or change the state associated with the service property 120 that results in an identical resultant state of the common service property 120 to which the command is directed. Moreover, the common service property 120 may also facilitate the immediate comprehension by a device in communication with the multiple disparate devices so as to knew the slate of the common service property 120 among those devices. In spite of the multitude of differences in other service properties 120 comprised by those devices. In this way, the time and effort in setting up and enabling the simultaneous operation and monitoring the status of multiple, disparate devices, which may have differing functionality and states outside the common service property 120, is substantially reduced.

A service method 130 may be understood as the performance of an action by the device associated with the definition. The operation of a service method 130 may result in the change of a state described by a service property 120. The description of a service method 130 may be sufficient to describe the action performed by the device without necessarily providing all the details regarding every step in the performance of the action. In some instances, a service method 130 may change the state of a service property 120. In some instances, a service method 130 may temporarily cause a change in state of a service property 120 to a value other than a value indicated by the service property prior to initiation of the service method, and upon completion of execution of the service method 130, may cause another change to the value of the service property 120, which may be the same as or different from the initial value thereof. In some instances, a service method 130 may not result in a change of state in a service property 120. Similar to the service property 120, a service method 130 may be defined such that a common service method 130 may be operated on multiple disparate devices, each comprising at least the one common service method 130, using a single command. In this way, the time and effort in enabling the simultaneous operation of multiple, disparate devices, which may have differing functionality, is substantially reduced.

A service event 140 may be understood as an event taking place at the device. Service events 140 may occur as the result of a change in state of the device, which in some embodiments means that a change in a service property 120 necessarily results in a service event 140. A service event 140 may be received by a machine in communication with the device that comprises a definition having a service 110 comprising the service event 140. For example, if the machine receives a service event 140 from a motion sensor indicating movement within a field of vision of the motion sensor of the device, the machine may issue a command to operate a lighting device associated with the motion sensing device, the association being defined by the machine. Similar to service properties 120 and service methods 130, a service event 140 may be defined such that a common service event 140 may be received from multiple disparate devices, each comprising at least the one common service event 140, and be readily understood by the receiving machine. In this way, the time and effort in enabling a receiving machine to receive common service events 140 from multiple disparate devices, which may have other different service events 140, is substantially reduced.

An exemplary service 110 is shown in FIG. 1, designated a BinarySwitch service 111. The BinarySwitch service 111 comprises many of the elements that may be comprised by a service 110, namely, a service property 120, in this instance a switch service property 121 and two service methods 130, namely a switchOn service method 131 and a switchOff service method 132. The switch service property 121 comprised by the BinarySwitch service 111 may be labeled "switch," indicating the power state of the device comprising the BinarySwitch service 111. The potential values of the switch service property 121 are "on," and "off," with the "on" value indicating the device comprising the BinarySwitch service 111 is currently operating or otherwise operable, and the "off" value indicating the device comprising the BinarySwitch service 111 is currently not operating or otherwise inoperable. While the values of the switch service property 121 are two in number, and opposite in meaning, it is contemplated and included within the scope of the invention that the values of a given service property 120 may be of any number and may have multiple differing meanings, e.g. indicating one of multiple different, but not opposite in meaning, state, indicating a proportional value of a characteristic of the operation of the device described thereby (e.g. volume of a speaker, brightness of a light bulb, etc.), and many other meanings. A novel feature of a service property 120 of the present invention, such as the switch service property 121 of the BinarySwitch service 111, is that for all devices that comprise the BinarySwitch service 111, the values of the switch service property 121 are constrained to "on" and "off." For devices that may have a sleep setting, some sort of low-power consumption mode that may facilitate faster startup time in a transition from "sleep" to "on" than "off" to "on," a different service 110, such as, for example "TrinarySwitch," may comprise an analogous service property 120 having three values: "on," "off," and "sleep." It is advantageous to define a given device using a service 110 that accurately describes and enables operation through the present invention of every value for a given service property 120, so as to fully utilize and accurately report every potential state of the device.

The BinarySwitch service 111 further comprises a switchOn service method 131 and a switchOff service method 132. For each defined service method 130 there is an attending description of the action performed by the method. The switchOn service method 131 is described as setting the switch service property 121 value to "on", and the switchOff service method 132 is described as setting the switch service property 121 value to "off." For those instances where the switch service property 121 value is "off" and the switchOn service method 131 is performed, the switch service property 121 value will be changed to "on," resulting a change in the state of the device comprising the BinarySwitch service 111. However, if the switch service property 121 value is "on" and the switchOn service method 131 is performed, the switch service property 121 value will remain on the value "on," and no change in the state of the device comprising the BinarySwitch service 111 will result in some embodiments, where the switch service property 121 for a device comprising the BinarySwitch service 111 is known to have an "on" value by a machine capable of communicating with the device comprising the BinarySwitch service 111, and where a request to perform the switchOn service method 131 is received by the machine that knows the switch service property 121 state, that machine may not transmit the command to run the switchOn service method 131, because that machine knows what the result of running the switchOn service method 131 is to set the switch service property 121 value to "on," and because the switch service property 121 state is "on" and that is known to that machine, the additional network traffic of sending the command from the machine to run the switchOn service method 131 on the device, as well as the computational expense of performing the switchOn service method 131 at the device is avoided. This illustrates an advantage of the service 110 of the present invention; the ability to both know the state of a service property 120 of a device as well as any effect of performing a service method 130 of the device, enables more intelligent decision making on the part of a machine in communication with the device to minimize the utilization of computational and network resources.

Referring now specifically to FIG. 2, another service 110 according to an embodiment of the invention is presented. The service 110 may be described as a MediaInfo service 112. The MediaInfo service 112 may comprise a plurality of service properties 120, comprising albumArt service property 122, albumTitle service property 123, artist service property 124, nextAlbumTitle service property 125, nextArtist service property 126, nextTrackName service property 127, and trackName service property 128. Illustrated by a number of the service properties 120 of the MediaInfo service 112 is the ability to define the format of the data constituting the value for the given service property 120. In the case of the albumArt service property 122, the value type is "uri," or Universal Resource Identifier. In the case of the albumTitle service property 123, the value type is a character string. It is contemplated and included within the scope of the invention that the value type for a given service property may comprise, but is not limited to, a URI, a URL, a string, a number, or any other data type or structure as is known in the art.

The MediaInfo service 112 further comprises an exemplary service event 140, the trackChanged service event 141. The trackChanged service event 141 indicates the track presently being played by the device has changed. Upon learning of such an event, a machine in communication with the device may perform some sort of action responsive to the event indicated by the trackChanged service event 141.

Referring now to FIG. 3, at least a portion of a definition 300 for a machine-to-machine communicating device 301 according to an embodiment of the invention is presented. The machine-to-machine communicating device 301 may be a so-called "smart speaker," a device capable of audio playback while communicating with a remote machine across a network and/or utilizing a machine-to-machine communication protocol. The definition comprises a plurality of services 310, including, but not limited to, BinarySwitch service 311, which may be identical to the BinarySwitch service 110 described hereinabove, an AudioOutput service 312, a MediaControls service 313, and a MediaInfo service 314, which may be identical to the MediaInfo service 113 described hereinabove. The definition 300 illustrates how the modular nature of each of the services of the plurality of services 310 may be readily implemented in a device that comprises the features, namely, the service properties, service methods, and service events associated with the given service. A given service may be incorporated into the definition 300 and, with the appropriate translation layer applied to the machine placed in communication with the device 301 so as to enable operation of the device, namely, send and receive transmissions to and from the device 301 that complies with the manufacturer requirements for communicating with the device 301 such that the various services may be translated into the appropriate transmission for the device 301, the functionality and ability to know the state of the device 301 is quickly implementable within the definition 300.

Included in the AudioOutput service 312 is the volume service property 321, which is defined by a numerical range from 0 to 100, with 0 being no volume and 100 being a maximum volume. The value of the volume service property 321 state may be any number within the range from 0-100, and may result in a proportional volume for playback on the device 301. The AudioOutput service 312 further comprises a mute service property 322 that is can have a true or false value, when in the true state essentially overrides the value in the volume service property 321 and renders the volume output of the device 301 to 0, and when in the false state enables the device 301 to playback audio at a volume level defined by the volume service property 321 state value.

While multifarious services, comprising multifarious service properties, services methods, and service events are describable, it is contemplated and included within the scope of the invention that any service that enables the monitoring of a given state of a machine-to-machine communicating device, as well as any attending method of operating said device and receiving indications of events from said device for such devices as are known in the art is contemplated and included within the scope of the invention. The particularities of a given service, while essential to the operation of a given device, are part and parcel with the modularity of the service to the extent the service is replicable and readily implementable among differing devices offering differing functionality, while still including the given service.

Figure 4:
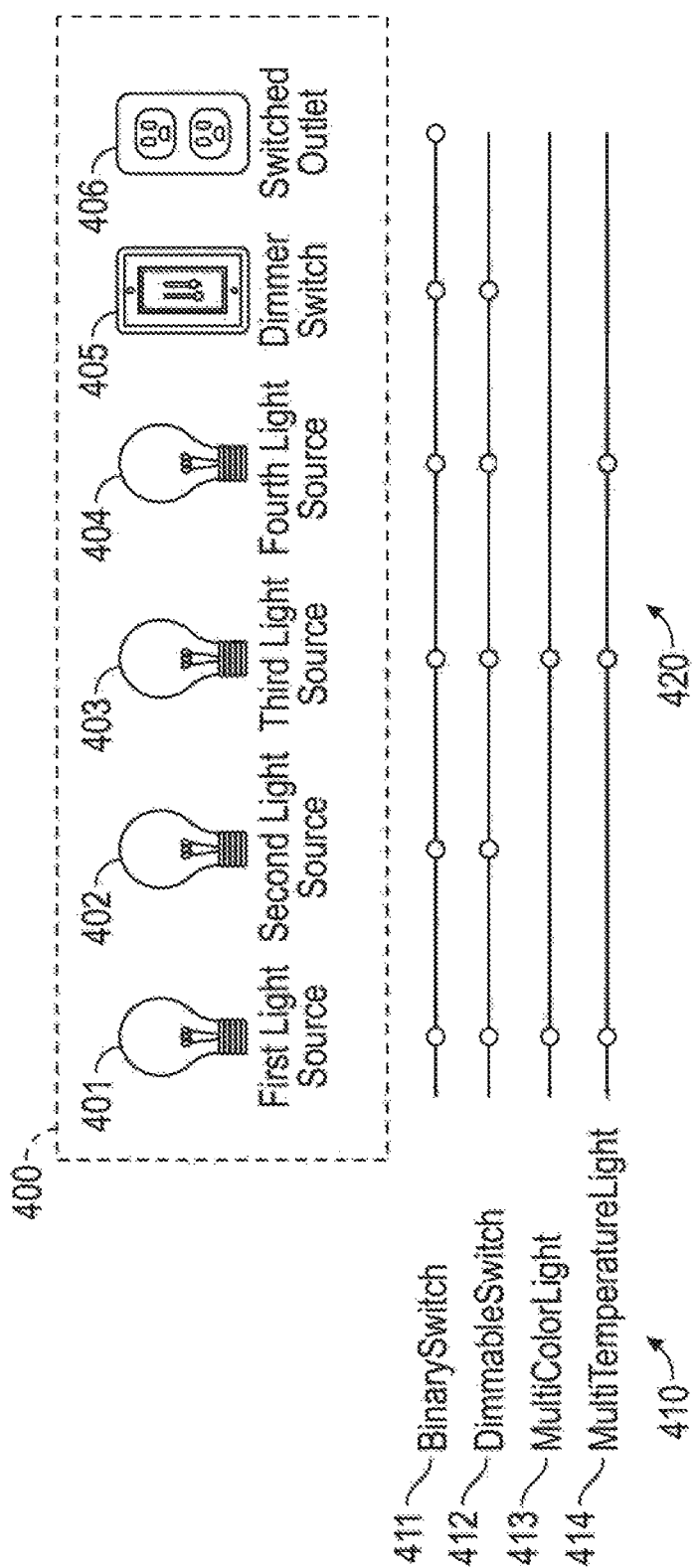
FIG. 4 is a diagrammatic representation illustrating the reusable nature of the service members in machine-to-machine communicating device definitions according to an embodiment of the invention.

An illustration of implementing common services among disparate devices is presented in FIG. 4. A plurality of devices 400 are illustrated in FIG. 4, including a first lighting device 401, a second lighting device 402, a third lighting device 403, a fourth lighting device 404, a dimmer switch 405, and a switched outlet 406. Among the plurality of devices 400 there are a plurality of shared services 410, including, but not limited to, a BinarySwitch service 411, a DimmableSwitch service 412, a MultiColorLight service 413, and a MultiTemperatureLight service 414. As can be seen, the devices of the plurality of devices 400 each use either all or some of the plurality of services 410 as indicated by array 420. More specifically, the definitions for the first light source 401 and the third light source 403 may each comprise the BinarySwitch service 411, the DimmableSwitch service 412, the MultiColorLight service 413, and the MultiTemperatureLight service 414. A definition for the fourth light source 404 may comprise the BinarySwitch service 411, the DimmableSwitch service 412, and the MultiTemperatureLight service 414. A definition for the second light source 402 may compose the BinarySwitch service 411 and the DimmableSwitch service 412. A definition for the dimmer switch 405 may comprise the BinarySwitch service 411 and the DimmableSwitch service 412. Finally, a definition for the switched outlet 406 may comprise the BinarySwitch service 411. Crucially, the exact same BinarySwitch service 411, having exactly the same constituent elements of the service (namely service properties, service methods, and service events) may be included in the definition for all of the plurality of devices 400.

Moreover, where multiple first light sources 401 are desired to be defined, the exact same set of services may be implemented for each individual device, thereby rapidly enabling the deployment of identical devices using a common set of services.

Figure 5:
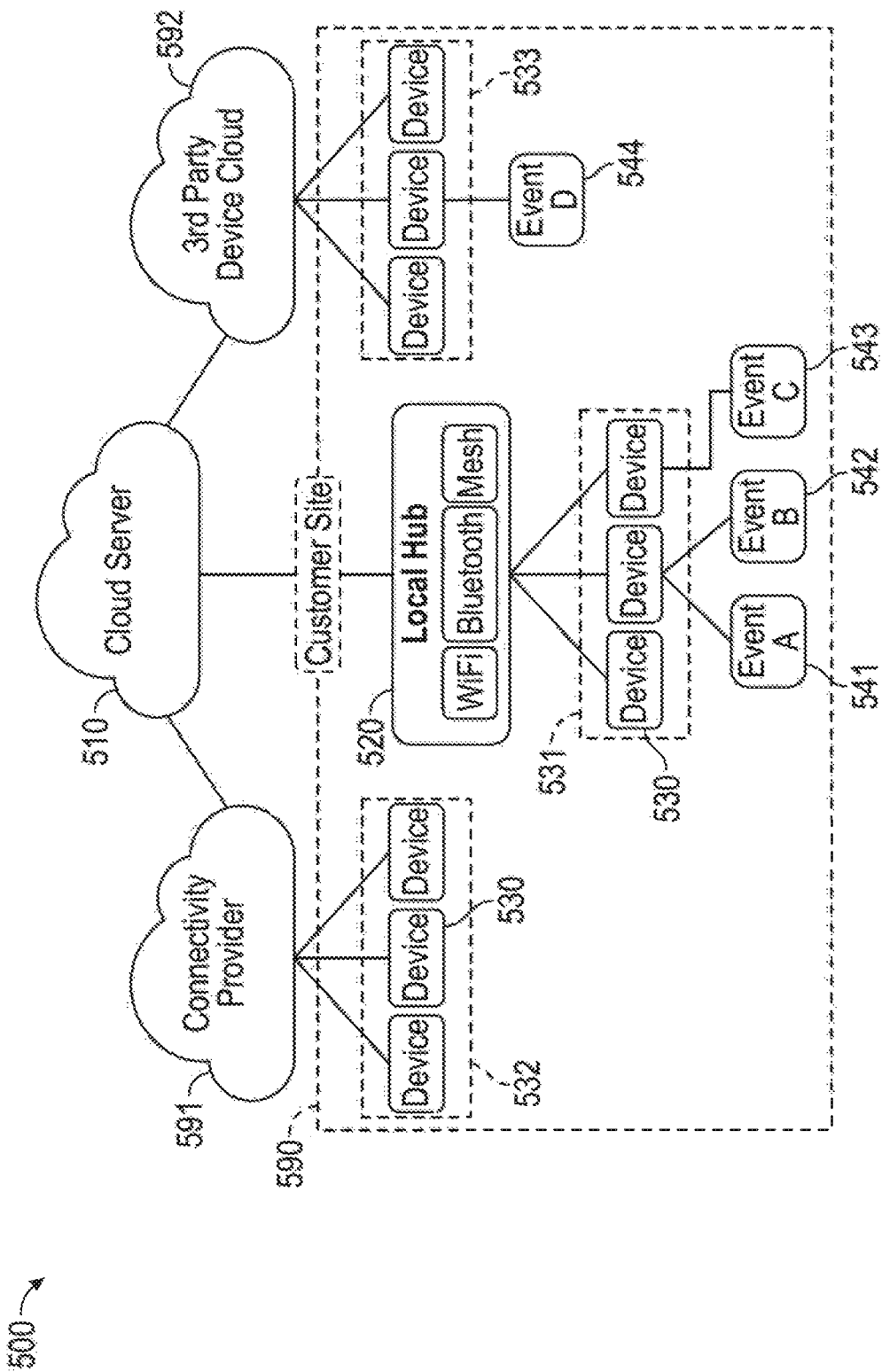
FIG. 5 is a schematic representation of a network of machine-to-machine communication devices according to an embodiment of the invention.

Referring now to FIG. 5, a delivery architecture 500 of a system that may implement the definition of devices as described hereinabove is depicted. Elements of the present invention comprise a cloud server 510 and a local hub 520. The cloud server 510 may be a remote computerized device, such as a server, that can be positioned in communication with the local hub 520 across a network, such as a Wide Area Network (WAN), including the Internet. The local hub 520 may be a computerized device, such as the machine discussed hereinabove, that may be placed in communication with, read and know the state of, issue commands to, and receive event indications from, a plurality of machine-to-machine communicating devices 530. Specifically, the local hub 520 may be positioned in communication with a first plurality of devices 531 that are in direct communication with the local hub 520. Each of the devices of the plurality of devices 531 may be defined by a definition as described hereinabove that is stored in memory at the local hub 520.

The local hub 520 may be a device that is operable to communicates with each of the cloud server 510 and the first plurality of devices 531. Such communication may be accomplished utilizing a network communication device as is known in the art, including, but not limited to, WiFi radio devices, Ethernet devices, Bluetooth radio devices, Zigbee or Z-Wave radio devices, and any other device that communicates using any wired or wireless communication protocol as is known in the art. The local hub 520 may be operable to both generate transmissions to be received by a device of the first plurality of devices 531 and to relay transmissions from the cloud server 510 to at least one device of the first plurality of devices 531. Furthermore, the local hub 520 may be configured to transmit information regarding at least one of a state associated with a device of the first plurality of devices 531 and an event received from a device of the first plurality of devices 531 to the cloud server 510.

The cloud server 510 may additionally be configured to communicate with a connectivity provider 591 associated with the customer site 590. An example of a connectivity provider is an Internet Service Provider (ISP) or any other type of connectivity provider that is off-site from the customer site 590 and may communicate with each of a machine-to-machine communicating device and the cloud server 510. The cloud server 510 may further be configured to communicate with a third party device cloud server 592. The third party device cloud server 592 may be similar to the cloud server in that it may communicate with a machine-to-machine communicating device located at the customer site 590 but not be affiliated with the connectivity provider 591. Examples of a third party device cloud server 592 include, but are not limited to, LifX, Philips Hue, Wink, Belkin WeMo, and many other machine-to-machine communicating device brands.

As depicted in FIG. 5, the local hub 520 may be physically located at a customer site 590, as may be the first plurality of devices 531. However, also located at the customer site 590 may be other machine-to-machine communicating devices not connected to the local hub 520. In FIG. 5, there is depicted a second plurality of devices 532 and a third plurality of devices 533. The second plurality of devices 532 may be connected to the connectivity provider 591, and the third plurality of devices 533 may be connected to the third party device cloud server 592. There may be no direct communication between either of the second and third pluralities of devices 532, 533, but the cloud server 510 may be operable to transmit and receive information to the first and second pluralities of device 532, 533 via the connectivity provider 591 and the third party device cloud server 592, respectively. Accordingly, in order to preserve the operability of the definitions as described hereinabove, the cloud server 510 may comprise a translation layer that is operable to translate information from the definition as described hereinabove into a transmission that can be understood by the receiving source, and translate information received from a transmitting source, so as to enable communication with each of the connectivity provider 591 and the third party device cloud server 592 while maintaining the modular nature of the definition architecture. Each of the connectivity provider 591 and the third party device cloud server 592 may require their own translation layer. Furthermore, any number of translation layers, enabling communication with any number of server devices, is contemplated to be comprised by the cloud server 510.

At least one of the cloud server 510 and the local hub 520, and in some embodiments both, may comprise a behavior engine. The behavior engine may be understood as a plurality of rules enabling the automatic performance of actions by either of the cloud server 510 and the local hub 520, based on precedent criteria, without the need for a user input or operation once the rule is comprised by the behavior engine. In some embodiments, the behavior engine may be understood as executable software that may be stored on and executed by a programmable device, such as a server, hub, router, personal computer, or any other computerized device including a microprocessor.

Figure 6:
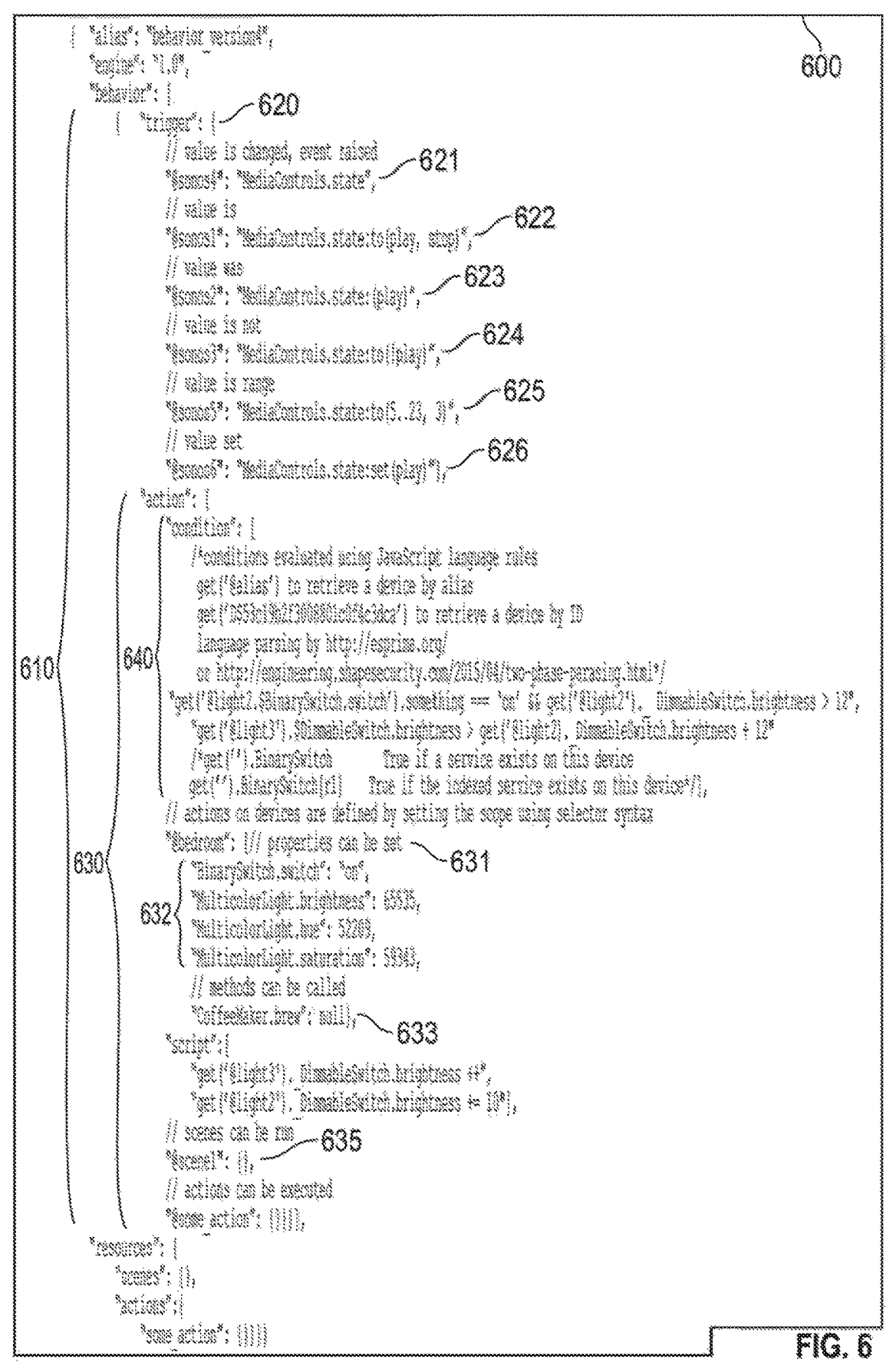

Referring now additionally to FIG. 6, a behavior engine 600 according to an embodiment of the invention will be discussed. The behavior engine 600 may be understood as a set of rules, with each rule being one or more actions to be performed upon precedent criteria being met. The present behavior engine 600 comprises a first rule 610. It is contemplated that a behavior engine may comprise any number of rules, and the comprisal of a single rule is not limiting. Each rule may comprise a trigger 620 and an action 630. A trigger 620 may be understood as a precedent criterion or multiple precedent criteria that must be met before the action 630 may be initiated. It is contemplated that any number of triggers and any number of criteria may be required and present in a given rule. In the first rule 610, the trigger 620 comprises first, second, third, fourth, fifth, and sixth criteria 621, 622, 623, 624, 625, 626. It is contemplated that the trigger may require one, any combination, or all of the first, second, third, fourth, fifth, and sixth criteria 621, 622, 623, 624, 625, 626 to be satisfied by the trigger 620 conditions for performance of the action 630.

The criteria comprised by the trigger 620 may be related to any service property, service method, or service event included within the definition of a device in communication with the machine associated with the behavior engine 600, for example, a machine the behavior engine 600 is stored on and/or performed or operated by. Each of the criteria may be simultaneously evaluated by the behavior engine 600 so to determine when any are satisfied. The first criterion 621 may evaluate whenever any state associated with the MediaControls service, meaning the value of any MediaControls service property, is changed or any MediaControls service event is received. The second criterion 622 may evaluate whether a MediaControls service property is changed from one particular value to another. The third criterion 823 may evaluate whether a MediaControls service properly is changed from a particular value. The fourth criterion 624 may evaluate whether a MediaControls service property is changed to a value other than a particular value. The fifth criterion 625 may evaluate whether a MediaControls service property is within a particular range. The sixth criterion 626 may evaluate whether a MediaControls service property is set to a particular value, which may also take the form of a MediaControls service method being commanded that will result in the particular value. The above criteria are exemplary only, and any state change, operation, or indication of event as may be provided by a machine-to-machine communicating device as is known in the art may serve as a trigger 620 criterion.

The action 630 may define an action to be performed upon the criteria of the trigger 620 being satisfied. The action 630 may comprise one of more conditions 640 that, similar to the trigger 620 criteria, may be a precedent condition that must be satisfied before the performance of the action 630 may be continued. In some embodiments, if the conditions 640 are not at the time of the first evaluation of the conditions 640, the operation of the action 630 may be terminated. In some other embodiments, if the conditions 640 are not at the time of the first evaluation of the conditions 640, the operation of the action 630 may continue for some defined length of time, number of evaluations, or until the conditions 640 are satisfied. The conditions 640 may be differentiated from the triggers 620 in that while the criteria of the trigger 620 are continuously evaluated, the criteria of the conditions 640 are not evaluated until the action 630 is performed. In this way, the resources utilized by the first rule 610 are reduced, as the behavior engine 600 is only continuously evaluating the trigger 620 criteria, and only evaluating the condition 640 criteria upon the trigger 620 criteria being satisfied. The criteria for the condition 640 may be similar to the criteria for the trigger 620, in that they may be any state, state change, operation, or indication of an event that may be received from, retrieved from, or sent to a machine-to-machine communicating device that may have a definition as described hereinabove.

The action 630 may further comprise a first action 631, which may be an operation that may result in an interaction with a machine-to-machine communication device having a definition as described hereinabove and in communication, either directly or indirectly (i.e. through a server in communication with the cloud server 510) with the machine the behavior engine 600 is operating on. The first action 631 of FIG. 6 includes setting a number of service properties 832 to desired values and calling a service method 633. It is contemplated and included within the scope of the invention that the action 630 may include second, third, and any number of actions similar to that of the first action 631, but including commands to set service properties and call service events for multifarious devices.

The scope within which an action 630 performs may be defined using selector syntax. In the present action 631, the scope is to "@bedroom," which can be interpreted as the ability to select any specific setting properties for devices associated with a bedroom that is associated with a location for which the behavior engine 600 is associated. It is contemplated and included within the scope of the invention that any selector syntax, including the use of index ranges, to define ranges including multiple devices, rooms, or any other scope of groupings as is known in the art, is contemplated and included within the scope of the invention. Because the scope of the action 631 encompasses a room, which may be understood as a collection of disparate devices, the service properties 632 set by the first action 631 and the service methods 633 called may be applied to all devices within the @bedroom scope to include the respective service properties 632 and service methods 633. This demonstrates the convenience of the modular nature of the definition described hereinabove: an action can be defined to operate to set service properties and call service methods without any prior knowledge as to what devices are presently within the scope of the rule, and without needing to update the rule upon a change in the devices within the scope of the rule, and moreover without needing to know what type of devices are within the scope; all devices with the services referenced by the action will be operated on.

The action 630 may further comprise a scene 635, which may be understood as setting a number of service properties for multiple devices defined in some sort of group, such as bedroom, living room, etc., that may be saved as a "scene," given a name, i.e. "@scene1" that can be a selector syntax as described hereinabove, that are set by operating the scene on the behavior engine 600.

In some embodiments, the behavior engine 600 may be operable to identify a pattern of behavior, such as identifying a precedent trigger criterion followed by the changing of one or more attributes of a remote device, which may be interpreted by the behavior engine as a behavioral pattern. The behavior engine 600 may further be operable to define a rule a comprising the trigger criterion and the action identified in the behavioral pattern as described hereinabove, and may execute that rule thereafter.

Referring now back to FIG. 5, a rule distribution aspect of the invention will be discussed. As mentioned hereinabove, a trigger for a rule may occur as a result of a service property having a particular state, a service method being called, or a service event providing an indication. In each instance, the trigger can occur at a device level. The monitoring of all possible triggers, if performed at a single, cloud level, for instance by the cloud server 510, would result in a very large resource demand, requiring enormous resource provision to the cloud server 510. Furthermore, centralizing the monitoring for all possible triggers increases the total network traffic, as the cloud server 510 will have to continuously monitor the conditions of all possible triggers, communicating with all devices across the Internet. In order to both reduce the resource demands on the cloud server 510, taking advantage of the resources available on both the local hub 520 and the plurality of devices 530 themselves, the various elements of the delivery architecture 500 may be configured to identify those rules that may be distributed down from the cloud server 510 to lower levels within the architecture 500. More specifically, software operating on at least the cloud server 510 and the local hub 520, and in some embodiments on the plurality of devices 530, may be operable to analyze the trigger events for a rule, identify a machine within the architecture 500 at which it is most efficient to operate the rule, and assign that rule to be operated by that machine.

The resultant distribution of rules depends on the definition of the rule; if the rule comprises a trigger from multiple or distant devices, from a network perspective, there is greater resource efficiency by distributing the rule to the cloud server 510, as the cloud server 510 is in communication with all devices of the architecture 500. For example, a rule that comprises triggers dependent on Event A 541, Event C 543, and Event D 544, the rule will be distributed to the cloud server 510, i.e. not distributed to a lower level device in the architecture 500, because of the network distance between Event D 544 and the other trigger events. More specifically, distributing the rule to the local hub 520 would be inefficient, as the local hub 520 would have to route transmissions to and from the device associated with Event D 544, which is not in direct communication with the local hub 520 as the device of the first plurality of devices 531 are, and therefore would increase total network traffic.

In contrast, a rule that comprises triggers dependent on Event A 541 and Event C 543 requires monitoring of only devices that are in communication with the local hub 520. Accordingly, the rule may be distributed to the local hub 520 from the cloud server 510. It is contemplated and included within the scope of the invention that when a rule is input anywhere within the cloud architecture 500, i.e. provided by a user using a device in communication with at least one of the cloud server 510 and the local hub 520, the rule may be analyzed by at least one of the cloud server 510 and the local hub 520 to determine distribution of the rule.

As another example, a rule that comprises triggers dependent on Event A 541 and Event B 542 is dependent on triggers from a single device. Accordingly, it is contemplated and included within the scope of the invention that the rule may be distributed to the device associated with Events A and B 541, 542, and be executed thereon. The ability to execute a rule on the lowest level (with device level being the lowest, cloud server 510 level being the highest) depends not only on the efficiency of monitoring the triggers comprised by the rule, but also the ability to execute the actions of the rule on the machine to which the rule is assigned. This will depend on the capability of the machine to interact with other machines within the architecture 500 to perform the rule.

Figure 7:
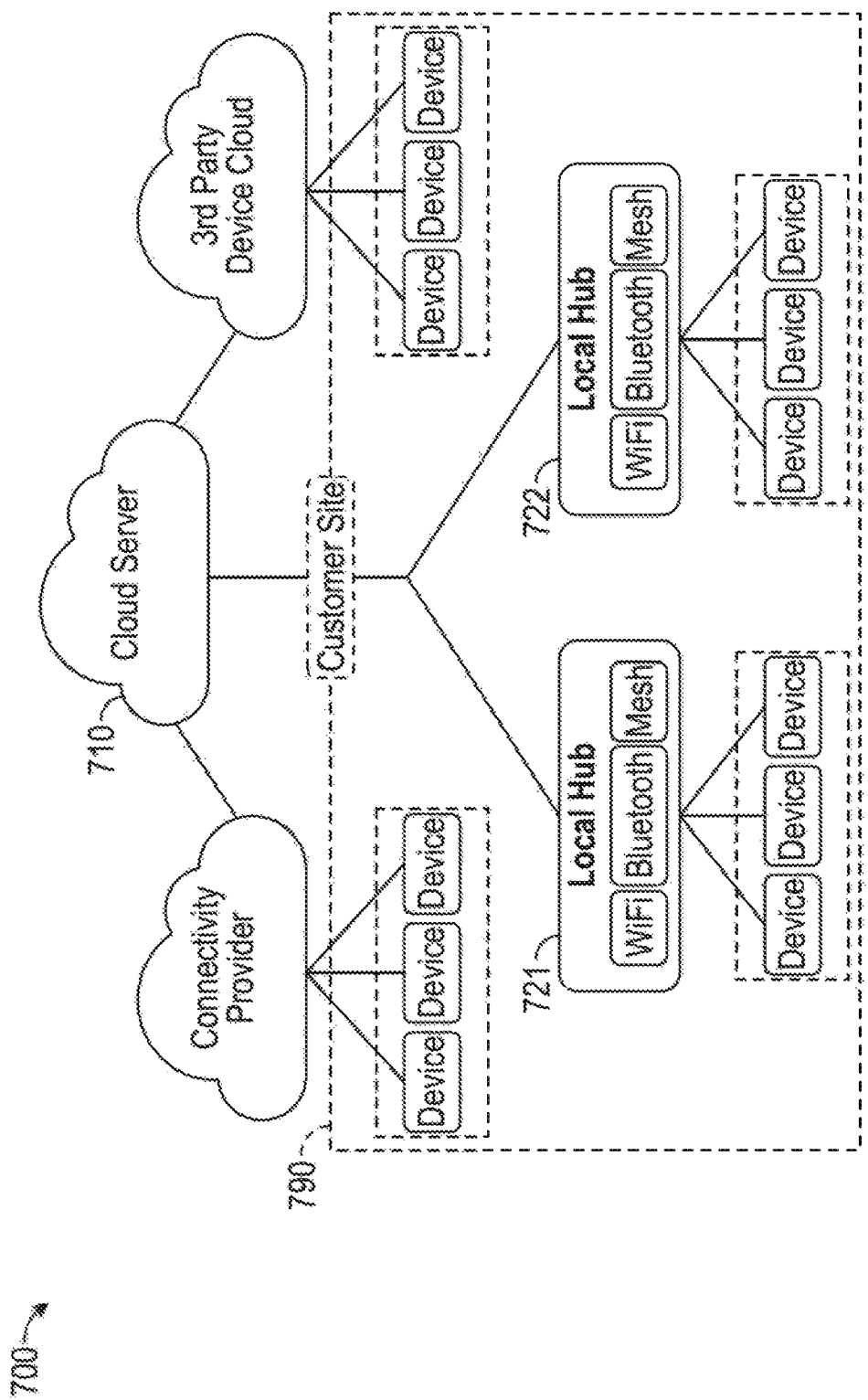
FIG. 7 is a schematic representation of a network of machine-to-machine communication devices according to an embodiment of the invention.

Referring now to FIG. 7, a delivery architecture 700 according to another embodiment of the invention is presented. The delivery architecture 700 comprises a cloud server 710 and a pair of local hubs 721, 722 positioned at the customer site 790. Having multiple local hubs at the customer site 790 enables the delivery architecture 700 to support more devices at the customer site 790 than present machine-to-machine communicating device protocols permit using a single local hub. The local hubs 721, 722 may communicate with each other to facilitate the operation of the delivery architecture 700, dynamically assign devices among each other, and balance resource demands among each other. It is contemplated and included within the scope of the invention that any number of local hubs may be located at the customer site 790 in communication with each other and the cloud server 710.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method for issuing commands to remote devices comprising:
    determining a criterion that forms a rule for a service, the service comprising a service property, a service method, and a service event, the service event being a change in the service property for a remote device, the criterion being a trigger criterion;
    distributing the rule to a behavior engine on at least one of a programmable device with the shortest network distance between the programmable device and the service event related to the trigger criterion, a local hub, and a cloud server, the behavior engine comprising a set of rules;
    identifying, at the behavior engine, a behavioral pattern related to the remote device;
    defining the rule comprised by the behavior engine based on the identified behavioral pattern;
    evaluating, at the behavior engine, if the trigger criterion for the rule is met; and
    upon determining that the trigger criterion is met, performing an action comprising;
    evaluating, at the behavior engine, if a condition is met; and
    upon determining that the condition is met, issuing a command to perform a first action comprising setting a scene, the scene comprising a plurality of service property settings and calling the service method for all of the remote devices including one of the plurality of service property settings within an action scope of the first action, the action scope being a collection of remote devices sharing a scope selector;
    wherein the local hub is operable to dynamically assign the remote devices; and
    wherein the cloud server comprises a translation layer operable to enable communication with each of a connectivity provider and a third-party device cloud server.

2. The method of claim 1 wherein the trigger criterion is at least one of the service property having a particular state, the service method being called, and the service event providing an indication.

3. The method of claim 1, wherein the trigger criterion is evaluated continuously by the behavior engine.

4. The method of claim 1, wherein the rule comprises a plurality of trigger criteria; and wherein the rule is distributed to a computerized device with the shortest network distance between the computerized device and events related to the plurality of trigger criteria.

5. The method of claim 1, wherein the rule is distributed to the cloud server; and
    wherein the method further comprises communicating with at least one of the connectivity provider and the third-party device cloud server.

6. The method of claim 5, further comprising: translating the command to a transmission that can be understood by at least one of the third-party device cloud server and the remote device.

7. The method of claim 1, wherein upon determining the condition is not met, performing at least one of terminating the action and repeating the evaluation of if the condition is met for at least one of some length of time, some number of evaluations, or until the condition is met.

8. The method of claim 1, further comprising:
performing the action for a length of time, defined as an action length;
identifying a new device within the action scope comprising the service property being set by the first action during the action length; and
performing the first action on the new device.

9. The method of claim 1, further comprising:
receiving a device definition comprising the service, the device definition defining a new device.

10. The method of claim 9, further comprising:
assigning the new device to one of a plurality of local hubs.

11. The method of claim 1, further comprising:
receiving a device definition, the device definition defining a new device;
translating the device definition to define the service associated with the new device.

12. A non-transitory computer readable medium comprising instructions that when executed by a processor define a service definition for a machine-to-machine communicating device configured to be transmitted to the machine-to-machine communicating device responsive to a determination by a behavior engine that a trigger condition meets a condition, the non-transitory computer readable medium comprising:
a service property describing a state of an attribute of the machine-to-machine communicating device;
a service method operable to cause a change in the state of the service property; and
a service event defining the result of performing the service method, the service event being a change in the service property;
wherein the service property is directed to the attribute shared between differing types of machine-to-machine communicating devices;
wherein the service method is operable to change the state of the service property on the differing types of machine-to-machine communicating devices; and
wherein the service property, the service method, and the service event are operable to indicate the trigger condition to the behavior engine;
wherein the behavior engine is on at least one of a programmable device with the shortest network distance between the programmable device and the service event related to the trigger criterion, a local hub, and a cloud server;
wherein the behavior engine is configured to identify a behavioral pattern related to the machine-to-machine communicating device and define a rule comprised by the behavior engine based on the identified behavioral pattern;
where upon the behavior engine determining the condition is met, a command is issued to perform a first action comprising setting a scene, the scene comprising a plurality of service property settings and calling the service method for all machine-to machine communicating devices including one of the plurality of service property settings within an action scope of the first action, the action scope being a collection of machine-to machine communicating devices sharing a scone selector;
wherein the local hub is operable to dynamically assign the machine-to-machine communicating devices; and
wherein the cloud server comprises a translation layer operable to enable communication with each of a connectivity provider and a third-party device cloud server.

13. The non-transitory computer readable medium of claim 12, wherein the service property is operable to be monitored concurrent with the same service property on a particular and/or differing machine-to-machine communicating device.

14. The non-transitory computer readable medium of claim 12, wherein the service method is operable to be executed concurrent with the same service method on a particular and/or differing machine-to-machine communicating device by a single command.

15. The non-transitory computer readable medium of claim 12, wherein the service event is operable to be received concurrent with the same service event from a particular and/or differing machine-to-machine communicating device.

16. The non-transitory computer readable medium of claim 12, wherein the service definition is configured to be included in a definition of the machine-to-machine communicating device that comprises multiple differing service definitions.

17. The non-transitory computer readable medium of claim 12, wherein the service definition is configured to be included in a definition of multiple instances of the same type of machine-to-machine communicating devices.

* * * * *